United States Patent [19]

Torrence

[11] Patent Number: 4,835,976
[45] Date of Patent: Jun. 6, 1989

[54] CONTROLLING SUPERHEAT IN A REFRIGERATION SYSTEM

[75] Inventor: Robert J. Torrence, Addison, Ill.

[73] Assignee: Eaton Corporation, Cleveland, Ohio

[21] Appl. No.: 168,041

[22] Filed: Mar. 14, 1988

[51] Int. Cl.[4] .............................................. F25B 41/04
[52] U.S. Cl. ........................................ 62/115; 62/204; 62/225; 62/228.3
[58] Field of Search .................. 62/225, 115, 228.3, 62/204; 374/27, 183; 236/75, 46 F

[56] References Cited

U.S. PATENT DOCUMENTS

| | | | |
|---|---|---|---|
| 3,698,204 | 10/1972 | Schletterbeck et al. | 62/206 |
| 3,735,603 | 5/1973 | Hamilton | 62/210 |
| 4,395,886 | 8/1983 | Mayer | 62/160 |
| 4,459,819 | 7/1984 | Hargraves | 62/212 |
| 4,474,022 | 10/1984 | Puskar | 62/96 |
| 4,478,051 | 10/1984 | Ibrahim | 62/212 |
| 4,499,739 | 2/1985 | Matsuoka et al. | 62/212 |
| 4,506,518 | 3/1985 | Yoshikawa et al. | 62/180 |
| 4,527,399 | 7/1985 | Lord | 62/212 |
| 4,548,047 | 10/1985 | Hayashi et al. | 62/160 |
| 4,571,951 | 2/1986 | Szymaszek | 62/212 |

FOREIGN PATENT DOCUMENTS

| | | | |
|---|---|---|---|
| 85/03761 | 8/1985 | PCT Int'l Appl. | 236/46 F |
| 2080981 | 2/1982 | United Kingdom | 236/46 I |

Primary Examiner—William E. Wayner
Attorney, Agent, or Firm—R. A. Johnston

[57] ABSTRACT

A vapor compression refrigeration system is which a self heated thermistor is located in the suction line downstream of the evaporator to directly sense the quality of the refrigerant flowing thereover. Appropriate circuitry measures the voltage drop across the thermistor and this drop is used to vary the duty cycle of the system's expansion valve thereby controlling the superheat of the evaporator.

12 Claims, 6 Drawing Sheets

CONTROLLING SUPERHEAT IN A REFRIGERATION SYSTEM

CROSS REFERENCE TO RELATED APPLICATIONS

This application is related to commonly owned co-pending application Ser. Nos. 119,009, filed Nov. 12, 1987 "Indicating Refrigerant Liquid Saturation Point", Ser. No. 007,861, now U.S. Pat. No. 4,794,762 filed Jan. 27, 1987 "Refrigerant Flow Control System" and Ser. No. 119,943, now U.S. Pat. No. 4,790,143 filed Nov. 13, 1987 "Superheat Control of Air Conditioning System Incorporating Fuel Cooler".

BACKGROUND OF THE INVENTION

The present invention relates to refrigeration systems for refrigerating or air conditioning a compartment such as the passenger compartment of a vehicle. Typically, air conditioning systems for passenger vehicles employ an engine driven compressor for circulating a charge of highly compressed refrigerant gas through an exothermic heat exchanger or condenser cooled by ambient air and the cooled liquid refrigerant flows through an expansion device for creating a substantial pressure drop to enable the condensed refrigerant to be circulated through an endothermic heat exchanger or evaporator located in the compartment to be conditioned or refrigerated. Heat absorbed by the evaporator boils and vaporizes the refrigerant which is returned as a superheat gaseous form to the inlet of the compressor. It has been found necessary to maintain a slight degree of superheat, i.e. vaporized refrigerant slightly above its saturation temperature, in order to provide maximum efficiency of the heat exchange in the evaporator and also to prevent return of liquid to the compressor and consequent compressor damage.

Heretofore, the pressure drop in the refrigerant between the condenser and evaporator has been provided by either a capillary tube or an expansion control valve. Typically, vehicle air conditioning system expansion control valves are pressure operated temperature sensing devices which respond to the temperature of the refrigerant to expand fluid in a closed chamber to act upon a diaphragm and control the position of the flow valve member. Examples of such valves are those described in U.S. Pat. No. 3,667,247 and U.S. Pat. No. 3,810,366. Pressure operated refrigerant expansion valves respond to an existing temperature condition of the refrigerant and thus control of the refrigerant flow lags the temperature of the air to be conditioned in the compartment.

It has thus been proposed to provide an electrically actuated expansion valve for controlling the flow of refrigerant in the vehicle air conditioning system, in order that the valves may be made to respond to an electrical control signal which can be generated by a microcomputer to anticipate the condition of the air in the passenger compartment based upon multiple sensed inputs to the microcomputer. In order to provide a vehicle air conditioning system which has the refrigerant flow controlled by an electrically operated expansion valve, it has been found necessary to provide an indication of the condition of the vaporized refrigerant returning to the compressor from the evaporator.

In co-pending application Ser. No. 007,147, titled "Controlling Refrigeration" filed Jan. 27, 1987, and assigned to the assignee of the present invention, it is disclosed that an electrically operated expansion valve can be employed in an automotive air conditioning system and controlled by comparing temperatures sensed by thermistors disposed respectively to sense the refrigerant temperature at the inlet and outlet of the evaporator. The thermistors provide electrical temperature indications to a microcomputer which generates a width-modulated pulse control signal having the pulse width or duty cycle varied in accordance with the temperature comparison to provide continuous control of the refrigerant flow to the valve. The system disclosed in the aforesaid co-pending application functions to maintain the refrigerant flow at a uniform temperature at the inlet and the outlet of the evaporator thereby maintaining slightly superheated vaporized refrigerant at the outlet of the evaporator. However, this type of control system is usable only in refrigeration or air conditioning systems having a relatively low pressure drop across the evaporator on the order of 25 psi (1.75 $kg/cm^2$).

Where it is desired to provide electrical control of a refrigerant expansion valve in an automotive air conditioning system, in applications where a relatively high pressure drop is permitted across the evaporator e.g. greater than 25 psi (1.75 $kg/cm^2$), it has been found difficult to provide a way or means of economically providing necessary inputs to the microcomputer and further has been found difficult to generate a satisfactory control signal for the valve which could anticipate and respond to variations in system thermal loading in a manner to produce the desired regulation of the air temperature in the passenger compartment. It has, therefore, been desired to find an economical way or means of electrically controlling refrigerant flow in a vehicle air conditioning system by an electrically operated expansion valve and to provide a degree of control sophistication and response such that the passenger compartment can be maintained at a relative constant comfort level despite a wide variation in ambient conditions and thermal loading of the system.

SUMMARY OF THE INVENTION

The present invention provides a unique and novel way of electrically controlling the flow of refrigerant in a vehicle air conditioning system and utilizes a microcomputer receiving a temperature input signal from a single thermistor for generating a width-modulated pulse control signal and having the pulse width or duty cycle thereof varied to provide proper control of refrigerant flow to maintain the passenger compartment at the desired comfort level. The control signal for the electrically operated refrigerant expansion valve of the present invention is generated by modulating the pulse width or duty cycle about a predetermined value in accordance with an algorithm or table of values. The predetermined value of the control signal pulse width is developed from calibrating the system at steady state thermal loading for a desired amount of superheat of the vaporized refrigerant returning to the compressor from the evaporator. The algorithm for modulating the pulse width of the control signal about the predetermined duty cycle is based upon coefficients developed from experimentally operating the system under varying thermal loading conditions.

The present invention employs a self-heated thermistor which senses the presence of liquified refrigerant in vaporized refrigerant returning to the compressor from the evaporator. The thermistor has a limited current flowing therethrough sufficient to maintain the thermistor at a temperature above the temperature of the refrigerant in the vaporized condition. The change in resistance of the heated thermistor due to the presence of any liquid in the refrigerant flow is detected. The change is resistance is converted to a digital representation in the form of an electrical signal pulse time. A reference pulse time is determined by calibrating the system for a predetermined desired amount of superheat with steady state thermal loading on the system.

In service, under varying thermal loading conditions on the system, the microcomputer compares the reference pulse time with the varying pulse signals; and, in accordance with an algorithm, or predetermined table of values, determines a suitable width-modulated pulse signal for operating the expansion control valve to maintain the system at the desired level of superheat.

A microcomputer generates a pulse width-modulated control signal for driving an electromagnetically actuated expansion valve in response to a temperature input signal derived from a single self-heated thermistor disposed in the refrigerant line for detecting the presence of liquified refrigerant in the refrigerant vapor returning the compressor inlet from the evaporator, thereby maintain a slight superheated condition of the refrigerant for optimum cooling efficiency.

The present invention thus provides a unique and novel means or way of electrically controlling a refrigerant expansion valve for an air conditioning system and particularly a system for automotive applications.

DETAILED DESCRIPTION

Figure 1:
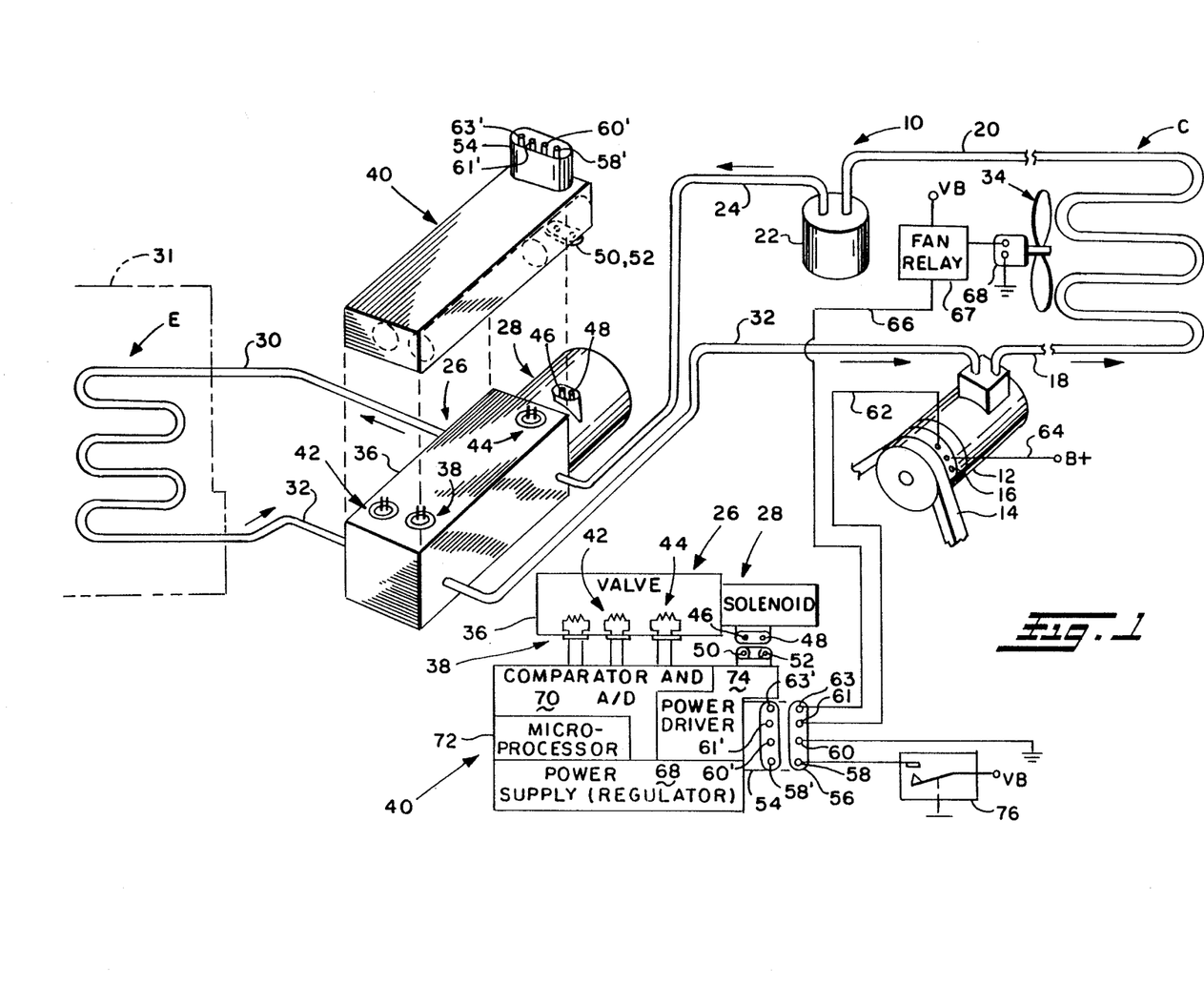
FIG. 1 is a pictorial somewhat schematic representation of the control system of the present invention.

Referring to FIG. 1, the control system of the present invention is indicated generally at 10 and employs a compressor or pump 12 powered by a drive belt 14 connected to the vehicle engine (not shown) and engaged by an electrically operated clutch 16. The compressor is charged with a suitable refrigerant such as freon 12 and discharges at its outlet through conduit 18 to a condenser indicated generally by the reference character C which is disposed for ambient cooling and which discharges through conduit 20 to a dryer 22 which has its outlet connected to the conduit 24 which is connected to the inlet of an expansion valve indicated generally at 26. The valve 26 is electromagnetically actuated by a solenoid 28 and has the lowered pressure outlet thereof connected through conduit 30 to the inlet of an endothermic heat exchanger or evaporator, indicated generally by the reference character E, which is disposed in heat-exchange relationship with the air in a vehicle passenger compartment to be cooled indicated generally by the dashed outline 31 in FIG. 1. The outlet of evaporator E is connected to conduit 32 which passes continuously through valve 26, without any valving, and for return to the inlet of compressor 12.

A motor driven cooling fan indicated generally at 34 is disposed for circulating air over the condenser C for cooling in the absence of vehicle motion or during limited airflow thereover.

The valve assembly 26 has a valve block 36 which has a thermistor, indicated generally at 38, mounted therein such that the resistance element of the thermistor is exposed directly to the refrigerant flowing through the conduit 32. The thermistor 38 is electrically in series with a current limiting resistor $R_{19}$ (see FIG. 2) and is connected to a controller indicated generally at 40.

Th controller 40 is, in the presently preferred practice, attached directly to the top or face of the valve block 36; and, the leads of the thermistor 38 extend inwardly of the controller 40 through apertures provided therein for electrical connection internally therewith. A second thermistor 42 is provided in the valve block with the resistances element thereof also disposed to sense the temperature of the refrigerant flowing through conduit 32. The thermistor 42 is similarly connected to controller 40 by extending into an aperture provided therein.

A third thermistor 44 is also provided in the valve block 36 and has the resistance element thereof disposed through the wall of the valve inlet conduit 24 to sense the temperature of high pressure refrigerant entering the valve. In the presently preferred practice of the invention, the thermistor 38 comprises an NTC device manufactured by Fenwall Electronics 63 Fountain Street, Framingham, Mass. 01701 and has manufacturers identification FD21J1-W, and has a resistance of 100 ohms at 25° C. In the presently preferred practice, the thermistors 42, 44 are 30 Kilo Ohm NTC thermistors available from Fenwall bearing manufacturer's designation UUR43J21.

The thermistor 38, 42, 44 are preferably mounted by employing the technique described with reference to FIG. 4 of co-pending application Ser. No. 007,861, filed Jan. 27, 1987 title "Refrigerant Flow Control System" and assigned to the assignee of the present invention; however, it will be understood that other mounting techniques may be employed if desired.

The solenoid 28 has a pair of terminal ends 46, 48 engaging a corresponding pair of pins 50, 52 provided on the controller 40 when it is mounted on the side of the block 36.

The controller 40 has a four pin connector 54 extending from one side thereof and adapted for connection to a mating four pin plug 56 shown schematically in FIG. 1. The plug connected for receiving the vehicle battery voltage denoted $V_B$ at pin 58 thereof with the second pin 60 connected to the vehicle ground. The third pin 61 is connected through lead 62 to one terminal of the compressor clutch 16 with the other terminal thereof connected through lead 64 to the $V_B$ voltage. A remaining pin 63 of plug 56 is connected through lead 66 to one terminal of the fan relay 67 with the output thereof connected to one terminal of a motor 68 for fan 34, with the remaining terminal of the motor connected to the ground.

The electrical pins on connector 54 of the controller are denoted by reference numerals 56', 60', 61' and 63', which correspond to the pins having similar numbers for the plug 56.

The controller 40 consists of a power supply 68 and amplification section 70, a microprocessor 72 and an output power driver section 74. A user or operator selector switch 76 is provided for energizing the system from the vehicle onboard power supply indicated as the voltage $V_B$.

Figure 2:
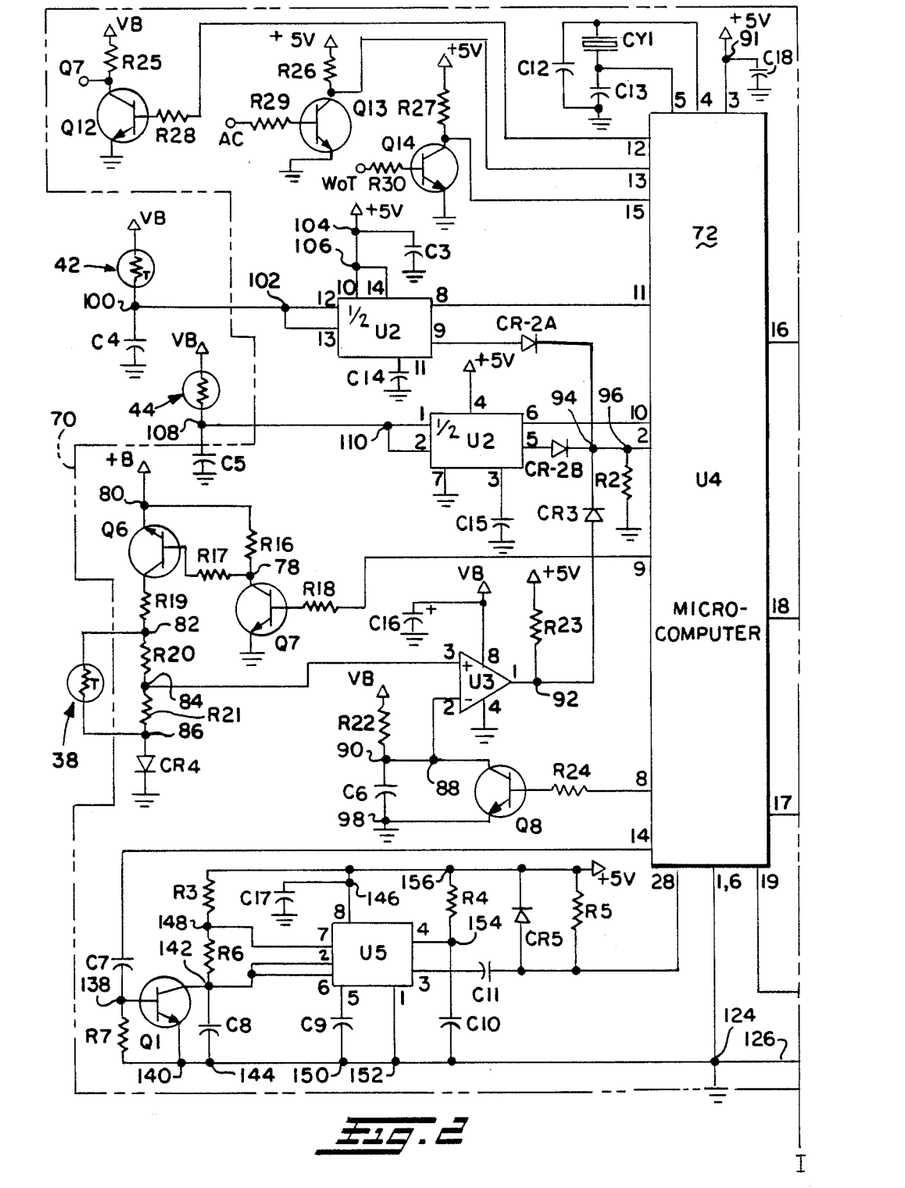
FIG. 2 is a portion of an electrical schematic for the system of FIG. 1 and is divided at section indicating line I—I.
Figure 3:
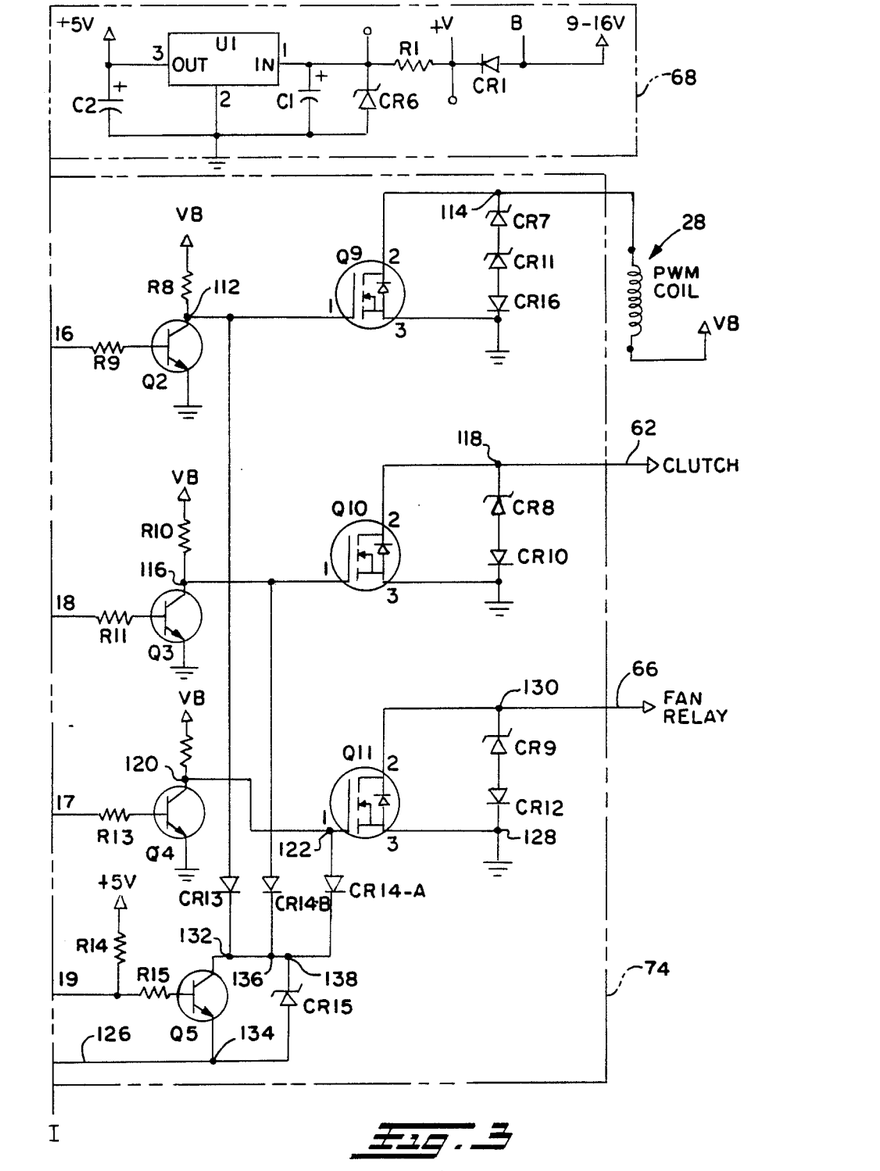
FIG. 3 is the remaining portion of the schematic divided about section indicating line I—I.

Referring to FIGS. 2 and 3, the electrical circuitry for the controller 40 and power supply 68 is shown schematically, as are the connections to the self-heated thermistor 38, the low pressure refrigerant temperature thermistor 42 and the high pressure refrigerant temperature 44.

Referring to FIG. 3 the power supply or regulator 68 preferably comprises a solid state device U1, bearing manufacturer's designation MC7805 available from the Motorola Corporation 20066 Algonquin Road, Schaumburg, Ill. 60175, which receives at pin one thereof a voltage $V_B$ from the vehicle battery typically nine to sixteen volts, through diode CR1 and resistor R1. Protective devices comprising capacitor C1 and zener diode CR6 in parallel with U1 protect the input from transient spikes and are grounded along with pin 2 of device U1. A grounded filter capacitor C2 is to the output pin 3 of U1 which output gives a regulated five volts.

Referring to FIG. 2 the microcomputer 72 comprises the device U4, which in the presently preferred practice is a solid state device bearing manufacturer's designation 6805P3 available from Motorola, which receives power at pin 3 thereof from the voltage regulator 68.

When voltage from output pin 9 of device U4 is received at the base of Q7 through resistor R18, Q7 conducts and drops the voltage at collector junction 78 which is biased positive through resistor R16 from the voltage regulator 48 and connected through R17 to the base of Q6. When the voltage at junction 78 is dropped, the base of Q6 is biased low through resistor R17, and Q6 is caused to conduct current from junction 80 which is biased positive by voltage from regulator 68 and also a voltage from junction 78.

Current flowing through Q6 flows through limit resistor R19 to junction 82, which is connected to resistor R20 and also the thermistor 38. Resistor R20 is connected to junction 84 which is connected through resistor R21 to junction 86 and also to the positive input of a comparator device U3. Junction 86 is grounded through diode CR4.

Junction 84 is disposed between resistors R20 and R21, which are in parallel with thermistor 38, and is connected to the positive input of comparator U3 at pin 3 thereof. A supply voltage $V_B$ is connected to pin 8 with pin 4 thereof grounded; and, the output thereof is biased through resistor R23 by five volts from the power supply 68 at junction 92. The negative input of U3 is connected to junction 88, the collector of Q8 and also to junction 90 which is grounded through capacitor C6 and biased through resistor R22 by the voltage $V_B$.

The microcomputer 72 is powered at pin 3 thereof from junction 91 which is biased to five volts from the power supply 68 and grounded through capacitor C18. A crystal oscillator CY1 is connected between pins 4 and 5 of the microcomputer 72 and provides, in the presently preferred practice, a 4.0 MHz timing signal.

When the voltage $V_B$ from pin 9 of the microcomputer is received through resistor R18 at the base of Q7, Q7 conducts and drops the voltage at junction 78 which is biased through resistor R16 from the voltage 68 through junction 80. When the voltage at junction 78 is dropped, the base of Q6 is biased low through resistor R17, and Q6 is caused to conduct current from junction 80 through dropping resistor R19 to junction 82 and through the thermistor 38 to ground through junction 86 and diode R4.

Some of the current flowing through Q6 also flows through resistors R20 and R21 to ground. The thermistor 38 is heated by the limited current through series resistor R19 to a temperature sufficient to maintain thermistor at a temperature slightly above that of the vaporized refrigerant flowing thereover. In the event that superheat is not maintained and liquified refrigerant is present at 38, such a condition is sensed by the sudden dramatic change in the temperature and resistance of the resistor 38 and consequently the voltage at junction 84 which is connected to the positive input of comparator U3.

The output of comparator U3 is applied through junction 92, which is biased to a positive five volts from power supply 68 to resistor R23 and applied through diode CR3 to junction 94 which is connected through junction 96 and to input pin 2 of the microcomputer U4. Junction 96 is also grounded through resistor R2.

Transistor Q8 has its emitter grounded through junction 98 and the base thereof connected through resistor R24 to pin 8 of microcomputer U4. Capacitor C6 is charged at junction 98 by the voltage $V_B$ through resistor R22; and, the voltage is applied through junction 88 to the the negative input pin 2 of comparator U3.

Upon receipt of a pulse from pin 8 of the microcomputer U4 through resistor R24, Q8 is caused to conduct to ground through junction 98, discharging capacitor C6 to ground through junction 98. As the capacitor C6 is charged, the time required to charge the capacitor to the voltage applied to the positive terminal of U3 from junction 84. The voltage from divider, comprising resistors R20 and R21 in parallel with the thermistor 38, is measured by the microcomputer U4 which receives a signal from the output of comparator U3 and junction 92 through junction 94 and 96 to pin 2 of the U4 computer. The time required to charge the capacitor is then used by the microcomputer to generate an output signal proportional to the charging time of capacitor C6, which thus gives a pulse width or digital representation of the refrigerant flow-induced resistance variation in thermistor 38.

It will be understood that the voltage divider, comprising resistors R20, R21 and the diode CR4 which has a voltage drop thereacross of about seven tenths (0.7) volt, maintains the signal to pin 3 of U3 above zero or ground, and slightly below $V_B$ in order that the comparator U3 will always read a difference at its input pins 2 and 3.

The resistance properties of the thermistor 38 employed in the present preferred practice, for differing temperatures, as provided by the manufacturer, are given in Table I below:

TABLE I

| °F. | °C. | R-T Curve | Alpha. Temp. Coeff. | Resis. Dev. |
| --- | --- | --- | --- | --- |
| −76 | −60 | 49.10 | 6.0 | 9.7 |
| −58 | −50 | 27.54 | 5.6 | 8.2 |
| −40 | −40 | 16.08 | 5.2 | 6.8 |
| −22 | −36 | 97.03 | 4.9 | 5.5 |
| −4 | −20 | 6.053 | 4.5 | 4.4 |
| 14 | −10 | 3.890 | 4.3 | 3.3 |
| 32 | 0 | 2.568 | 4.0 | 2.3 |

TABLE I-continued

| °F. | °C. | R-T Curve | Alpha. Temp. Coeff. | Resis. Dev. |
|---|---|---|---|---|
| 50 | 10 | 1.731 | 3.8 | 1.3 |
| 68 | 20 | 1.194 | 3.6 | 0.3 |
| 77 | 25 | 1.00 | 3.5 | 0.0 |
| 86 | 30 | .8413 | 3.4 | 0.6 |
| 104 | 40 | .8040 | 3.2 | 1.4 |
| 122 | 50 | .4412 | 3.1 | 2.4 |
| 140 | 50 | .3275 | 2.9 | 3.1 |
| 158 | 70 | .2468 | 2.8 | 3.7 |
| 176 | 80 | .1856 | 2.7 | 4.4 |
| 194 | 90 | .1460 | 2.6 | 5.1 |
| 212 | 100 | .1140 | 2.5 | 5.7 |

R-T: multiply resistance at 25° C. by listed valve to obtain resistance at temperature.

Alpha temperature coeff: denotes percent in resistance change per °C. at a specific temperature.

Resistance Deviation: add to resistance tolerance at reference temperature (25° C.) to give complete percentage of resistance deviation.

Referring to FIG. 2, thermistor 42 (non-self heated) is biased by voltage $V_B$ and connected to junction 100 which is connected to ground through capacitor C4 and also to junction 102 which is connected to input pin 12 and 13 of one half of a device U2 which in the presently preferred practice comprises a timer device bearing manufacturer's designation NE556D, available from National Semiconductor Corp. 2900 Semiconductor Drive, Santa Clara, Calif., 95057. The pins 10, 14 of device U2 receive a bias of positive five volts through junction 104 and 106, the former being connected through capacitor C3 to ground. Pin 11 of the device U2 is connected through capacitor C14 to ground; and, pin 8 thereof is connected to output pin 11 of the microcomputer U4. Output pin 9 of device U2 is connected through diode CR-2A which is connected through junctions 94 and 96 to an input pin 2 of the computer U4.

When a signal from the microprocessor pin 11 is applied to pin 8 of the device U2, it triggers U2 to discharge capacitor C14. When the voltage on pins 10 and 14 of U2 from junction 102 reach two-thirds of the bias voltage, U2 applies a signal through its output pin 9 and diode CR-2A to junctions 94, 96 and input pin 2 of U4. The microprocessor U4 measures the time to receive the signal, the time measurement giving a digital representation of the voltage on junction 100. The microcomputer can then look up the temperature of thermistor 42 from a stored table of voltages, resistances and temperatures provided by the manufacture of the thermistor 42.

In the presently preferred practice, thermistor 42 is a 30 Kilo-ohm NTC thermistor available from Fenwall bearing manufacturer's designation UUR43J21 and Table II gives manufacturer's data of resistance values for differing temperatures.

Figure 6:
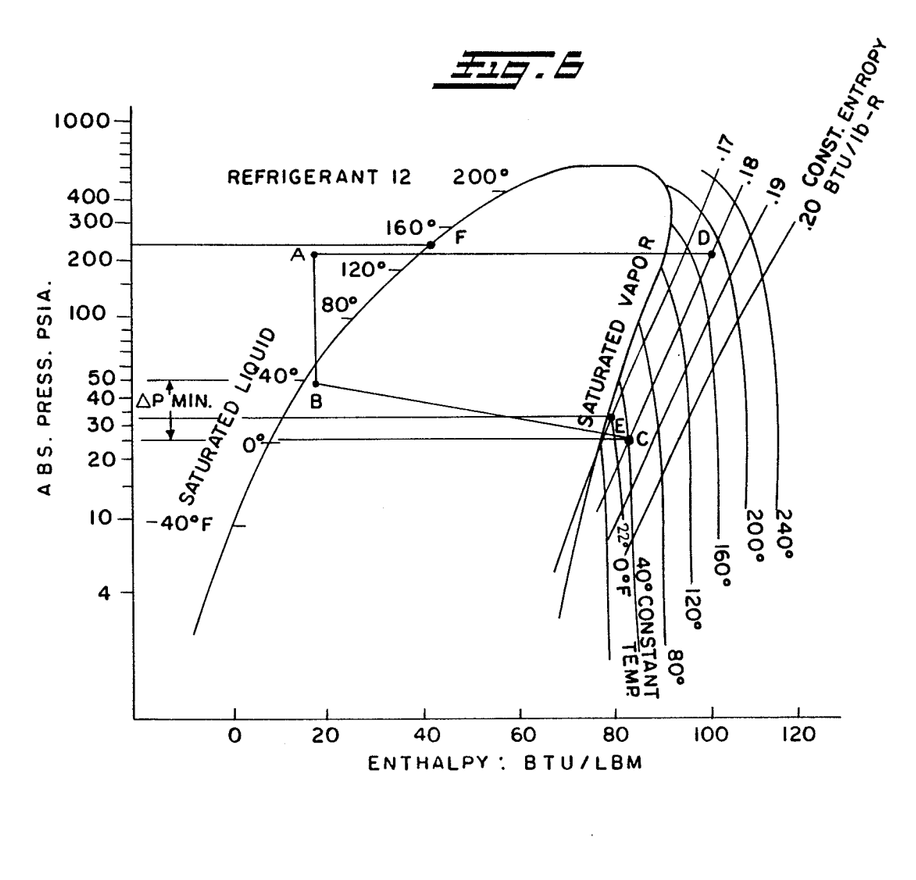
FIG. 6 is a pressure-enthalpy diagram for refrigerant R12.

Referring to FIG. 6, it will be understood that point "D" represents compressor discharge, point "A" is condenser discharge, point "B" is expansion valve discharge and point "C" is compressor inlet. Preferably, $\Delta P_{MIN}$ is at least 25 psi (1.75 Kg/Cm²) and generally the order of 75 psi (5.27 Kg/CM²).

TABLE II

| °C. | OHMS | °C. | OHMS |
|---|---|---|---|
| −40 | 884,600 | 60 | 7,599 |
| −20 | 211,200 | 70 | 5,359 |
| −10 | 152,000 | 80 | 3,843 |
| 0 | 94,980 | 90 | 2,799 |
| 10 | 58,750 | 100 | 2,799 |
| 20 | 37,300 | 110 | 2,069 |
| 30 | 24,270 | 120 | 1,550 |
| 40 | 16,150 | 130 | 1,176 |
| 50 | 18,970 | 140 | 903.0 |
|  |  | 150 | 550.2 |

The actual refrigerant temperature sensed by thermistor 42 can then be employed to determine whether a low-pressure condition exists. Assuming a 5° superheat condition is to be maintained, and that a low pressure threshold of 18 psig is defined, the pressure-enthalpy diagram (or table) such as FIG. 6 for the refrigerant is entered for saturated vapor at 18 psig and the temperature is determined and 5° F. added to give the temperature corresponding to 18 psig (32.7 PSIA) or 1.28 Kg/Cm². In the presently preferred practice, for refrigerant freon 12, the temperature sensed by thermistor 42 corresponding to 18 psig at 5° F. superheat is 22° F. as shown at point "E" in FIG. 6. The compressor is re-energized at 42 psig saturation pressure which, for freon 12 corresponds to a temperature at thermistor 42 of 46° F.

In typical automotive applications, it is desired to disable the system when a high-pressure condition exists in the condensor discharge line at thermistor 44. This latter condition, in the presently preferred practice, is defined as a condition of at least 245 psig (17.2 Kg/Cm²) refrigerant pressure in the condensor discharge line. Where refrigerant freon 12 is employed, the pressure-enthalpy diagram, FIG. 6 gives at point "F" a temperature of 123° F. (51° C.) (which is obtained by subtracting 25° F. subcooling of the condenser from the 148° F. saturation temperature) to be sensed by thermistor 44 to indicate a high pressure condition for which it is desired to disable the compressor. Shut down may be automatic by the microprocessor, or performed manually in response to an alarm given to alert the system operator.

Alternatively, thermistor 44 may be self-heated and sense saturation temperature, which is then converted to saturation pressure and the compressor disable when the saturation pressure exceeds a predetermined limit value, preferably 245 psig, in the manner shown and described in commonly owned copending application "Indicating Liquid Refrigeration Saturation Point", Ser. No. 119,009, filed Nov. 12, 1987.

For automatic shutdown microprocessor U4 provides a signal on output pin 18 to effect de-energization of the compressor clutch as will be hereinafter described. A disable signal is also provided at pin 16 of the microprocessor for disabling the control signal to the valve solenoid 28 as will hereinafter be described.

Referring to FIG. 2, thermistor 44 which preferably is identical to thermistor 42, receives in a manner similar to thermistor 42, a positive voltage $V_B$ and is series connected to junction 108 which is connected to capacitor C5, which is grounded. Junction 108 is also connected to junction 110 which is in turn connected to input pins 1 and 2 of device U2. Pin 4 of U2 is biased at five volts from power supply 68, and pin 7 is grounded and pin 3 connected to the capacitor C15 which is grounded. Pin 6 of device U2 receives an output from pin 10 of microprocessor U4 and the output of U2 is connected through diode CR-2B to junction 94 for input to pin 2 of the microcomputer U4.

The voltage at junction 108 from thermistor 44 is processed through one-half of device U2 in a manner similar to the signal from junction 100 discussed above with respect to thermistor 42. The thermistor 44 functions to sense over-temperature, indicative of an over-pressure condition, of system or a loss of refrigerant charge. Upon the device U4 sensing a thermistor temperature output in excess of a preselected maximum preferably chosen as 51° C., as described above the microcomputer, upon receiving a signal at pin 2 is operative to provide an output at pins 16, 17 and 18 for disabling the condenser fan motor, compressor and valve through the power driver 74.

In the presently preferred practice, microcomputer U4 is also operative to disable the condenser fan when thermistor 44 senses a temperature below 33° C. and to enable the fan when the thermistor senses a temperature above 35° C.

Referring to FIG. 3, the power driver section 74 of a controller 40 is shown and receives the output of pin 16 of the microcomputer U4 through resistor R9 to the base of Q2 which has its emitter junction grounded and its collector junction 112 biased through resistor R8 to the voltage $V_B$. The collector junction 112 is connected to pin 1 of the base of power FET Q9 which has output pin 3 thereof grounded and output pin 2 connected to junction 114 which is connected to the solenoid coil 28 of valve 26. The output of Q9 is protected by Zener diodes CR7 and CR11 and diode CR16 connected between junction 114 and ground.

When a signal is received from pin 16 at Q2, Q2 conducts, thereby causing Q9 to conduct current to ground through the coil 28 for energizing the refrigerant valve. When Q2 is turned OFF, Q9 does not conduct and the valve coil 28 is disabled.

In a similar manner Q3 receives an output from pin 18 of U4 through R11 at its base and has its collector junction 116 connected to the base at pin 1 of power FET Q10. Junction 116 is biased through resistor R10 by voltage $V_B$ from the power supply 68 and Q10 has output pin 3 thereof grounded with the remaining output pin 2 connected through junction 118 to the clutch lead 62. The output of Q10 is protected by Zener diode CR8 and diode CR10 connected between junction 118 and ground. Transistor Q3 and power FET Q10 function in a manner similar to that described above with respect to Q2 and Q9. Q3 and Q10 function to energize and de-energize the compressor clutch 16.

Referring to FIG. 3, output pin 17 of microcomputer U4 is connected through resistor R13 to the base of Q4 which has its emitter grounded and its collector junction 120 biased by the power supply voltage $V_B$ and connected through junction 122 to the base of power FET Q11. One output of Q11 at pin 3 is grounded through junction 128 and the other output at pin 2 is connected through junction 130 to the fan relay lead 66. Devices Q4 and Q11 function in a manner similar to those described above with respect to the driving and disabling of the refrigerant valve coil 28 and the compressor clutch 16.

The collector junction 112 of Q is connected through diode CR13 to the collector of transistor Q5 at junction 132. Q5 has its emitter connected to junction 134 which is grounded through lead 126 and junction 124 (see FIG. 2). Similarly, transistor Q3 has its output from collector junction 116 protected by diode CR14-B connected therefrom to junction 136 which is connected to junction 132 of Q5. The output of transistor Q4 is protected by diode CR14-A connected from junction 122 to junction 138 which is also connected to junctions 136 and 132 with Zener diode CR15 connected between junctions 138 and 134 biased as indicated in FIG. 3.

During power-up, a signal is received at the base of Q5 from pin 19 of computer U4, which turns Q5 ON to ground the output of transistors Q4, Q3 and Q2.

Referring to FIG. 2, controller 40 includes a "dead man" timer which monitors the microcomputer function. Microcomputer U4 provides an output on pin 14 thereof through capacitor C7 to junction 138 which is connected to the base of transistor Q1 and also through resistor R7 and junctions 140, 124 to ground. The emitter of Q1 is grounded through junction 140, 124 and the collector is connected to junction 142 which is biased through resistors R3 and R6 by a voltage of five volts from the power supply 68. Junction 142 is connected through capacitor C8 and to ground through junction 144, 124 and also to input pins 2 and 6 of device U5. In the presently preferred practice of the invention U5 is a National Semiconductor NE5550 device which has biased at pin 8 thereof to five volts through junction 146 which is also grounded through capacitor C17.

A second input of U5 through pin 7 is connected to junction 148 between resistors R3 and R6. Pin 5 of device U5 is grounded through capacitor C9 and junctions 150, 124. Pin 1 of U5 is similarly grounded through junctions 152, 124. Pin 4 of device U5 is connected to capacitor C10 and ground through junctions 153, 124 and is connected to junction 154 which is biased to five volts through resistor R4 and junction 156. Pin 3 of U5 is connected through capacitor C11 to pin 28 of microcomputer U4. The output of U5 at pin 3 is protected by diode CR5 and resistor R5.

The device U5 is operative such that if a signal is not received from pin 14 to Q1 after a preselected interval, preferably 70 milliseconds, U5 is not reset by Q1 and provides a reset signal through pin 28 to the microprocessor U4.

Typical values of resistances, capacitances and designations for said solid state devices are given below in Table III.

TABLE III

| R | Resistance Ohms | C | Capacitance Farads | Device Designation | Type |
|---|---|---|---|---|---|
| 1 | 56 | 1 | 10 u, 35 r | CY1 | 4.0 MHz |
| 2 | 10K | 2 | 0.1 u, 50 v | CR1, 10, 16, 12 | GL41D |
| 3 | 100K | 3 | 0.1 u | CR2 | MMBD2838 |
| 4 | 30K | 4 | 0.1 u | CR3, 14 | MMBD914 |
| 5 | 10K | 5 | 0.1 u | CR4 | TMBD4448 |
| 6-8 | 1K | 6 | 0.1 u | CR5 | MMBD514 |
|  |  | 7 | 0.1 u | CR6 | MLL4745, 18 V, 1 W |
|  |  | 8 | 0.1 u | CR7 | IN5349, 12 V, 5 W |
| 9 | 2.2K | 9 | .01 u | CR8 | IN5359, 24 V, 5 W |
| 10 | 1K | 10 | 2.2 u | CR9 | MLL4749, 24 V, ¼ W |

TABLE III-continued

| R | Resistance Ohms | C | Capacitance Farads | Device Designation | Type |
|---|---|---|---|---|---|
| 11 | 2.2K | 11 | 2.2 u | | |
| 12 | 1K | 12 | 18 pf | CR11 | IN5349, 12 V, 5 W |
| 13 | 2.2K | 13 | 18 pf | | |
| 14 | 10K | 14 | .01 u | CR13 | NMBD914 |
| 15, 16 | 2.2K | 15 | .01 u | | |
| | | 16 | 0.1 u | CR15 | MLL4746, 18 V, 1 W |
| 17 | 1K | 17 | 0.1 u | | |
| 18 | 2.2K | 18 | 0.1 | U1 | MC7805 |
| 19 | 120 | | | U2 | NE556D |
| 20 | 11K | | | U3 | 2N2903D |
| 21 | 91K | | | U4 | 68705P3 |
| 22 | 200K | | | U5 | NE5550 |
| 23 | 1K | | | $Q_1$–$Q_5$ | 2N3904 |
| 24 | 2.2K | | | Q6 | 2N3906 |
| | | | | Q7, Q8 | 2N3904 |
| | | | | Q9–Q11 | BT3-130 |

The procedure for determining the characteristics of the control signal for driving the solenoid 28 of expansion valve 26 will now be described with respect to determination of the algorithm or governing equation for determining the pulse-width of the control signal. The system is set-up and operated experimentally with a pressure transducer (not shown) located near thermistor 38 to read the evaporator outlet pressure. The system is run at varying thermal loads on the evaporator and condenser. The control signal to the valve is then varied by having the pulse width thereof modulated to change the refrigerant flow and correspondingly superheat (SH).

Superheat is determined and monitored by converting the pressure sensed by the transducer to saturation temperature $T_S$, and subtracting $T_S$ from the temperature $T_A$ sensed by thermistor 42, i.e.

$$SH = T_A - T_S$$

Figure 4:
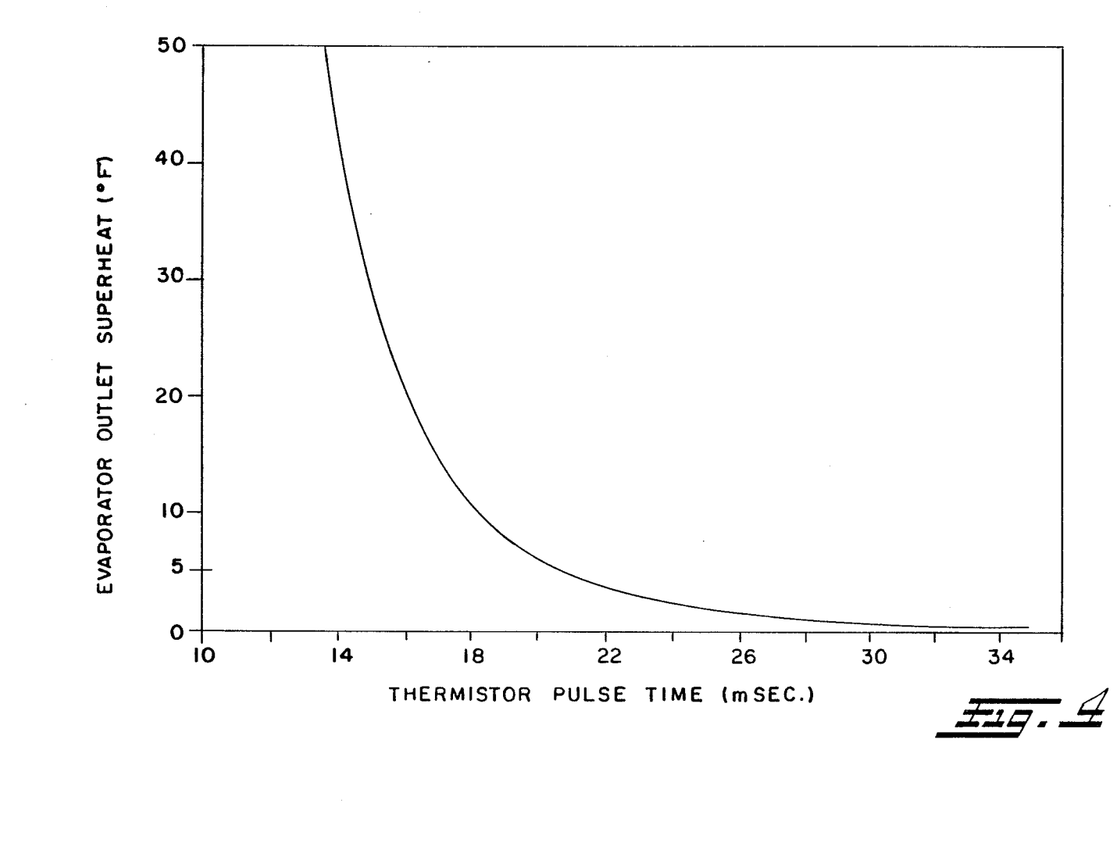
FIG. 4 is a graph of values of thermistor pulse time versus superheat for steady state thermal loading of the system of FIG. 1.

The system is then operated over a range of 0° F. < SH < 40° F. and values of pulse time $P_t$ for different values of superheat are plotted, as shown in FIG. 4. From the graph of FIG. 4 it is determined that for the desired 5° of superheat the corresponding pulse timer of about 20 milliseconds is required to maintain adequate refrigerant flow.

This value of pulse time, is then defined as $Pt_0$ as the pulse time for steady state thermal loading of the system at a desired 5° superheat.

Figure 5:
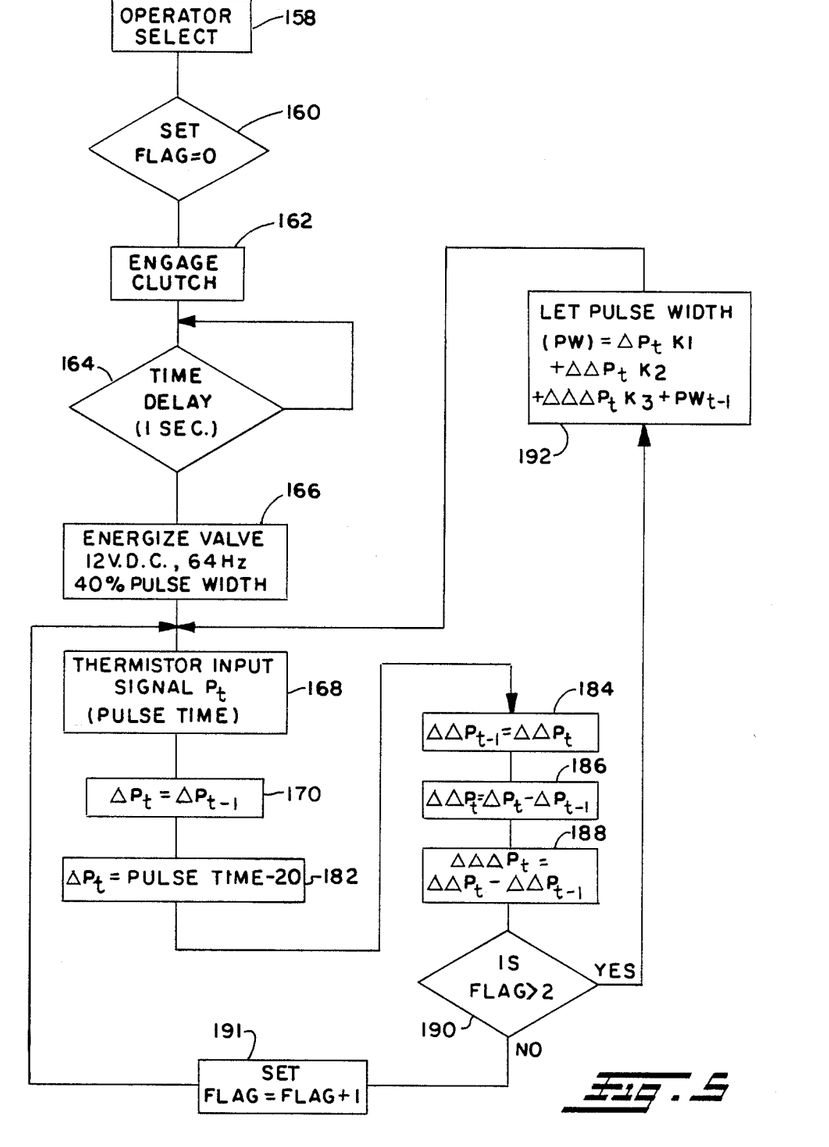
FIG. 5 is a block diagram of the generation of the pulse width modulated control signal.

Having determined $Pt_0$, the pulse width PW for the valve control signal under dynamically varying thermal conditions, e.g. in-service operation, may then be determined from the governing equation which will be set forth as follows:

Define $\Delta P_t = P_t - 20$ ms, where $P_t$ is the pulse time in milliseconds of thermistor 38 at pin 2 of microcomputer U4. Referring to FIG. 5, upon initial activation of the system by closure of switch 76 (see FIG. 1), at step 158 index flag is set equal to zero in step 160 and compressor clutch 16 is energized at step 162. After a suitable time delay at step 164, preferably on the order of one second, the solenoid valve 128 is energized initially at step 166 with a 40% pulse width signal at 12 volts d.c. at a frequency of 64 Hz.

The input signal from thermistor 38 is received by the microcomputer at step 168 and the term $\Delta P_{t-1}$ is set equal to the value of $\Delta P_t$ before updating the value of $\Delta P_t$ in step 182. The current value of $\Delta P_t$ is set equal to the pulse time minus 20 milliseconds in step 182. The change in $\Delta P_t$ defined as $\Delta\Delta P_t$ is set equal to the previous value of $\Delta\Delta P_t$ in step 184. The current value of $\Delta\Delta P_t$ is computed in step 186 as the difference between $\Delta P_t$ and the previous $\Delta P_{t-1}$.

The change in $\Delta\Delta P_t$ is computed in step 188 as the difference between $\Delta\Delta P_t$ and the previous value of $\Delta\Delta P_{t-1}$. At step 190, if the index "Flag" is greater than 2, the microcomputer proceeds to step 192; and, if flag is not greater than 2 at step 190, the microcomputer proceeds to step 191 to set Flag equal Flag plus 1 and returns to step 168.

At step 192 the value of the control signal pulse width $(PW)_t$ is computed as a summation of three terms in accordance with the following expression:

$$(PW)_t = \Delta P_t K_1 + \Delta\Delta P_t K_2 + \Delta\Delta\Delta P_t K_3 + (PW)_{t-1}.$$

In the presently preferred practice of the invention, the sampling or scan rate is chosen as 0.75 seconds for updating the calculation for the pulse width (PW).

The procedure for determining the coefficients $K_1$, $K_2$ and $K_3$ will now be described with respect to experimental operation of the system. The system is set up and operated experimentally, with a pressure transducer is hereinabove described, at a steady-state thermal loading on the evaporator and condenser; and, the microcomputer U4 is emulated to permit varying the coefficient $K_1$. The coefficient $K_1$ is varied until the superheat (SH) computed from $T_S$ and $T_A$ as described hereinabove is regulated satisfactorily about a value of 5° F. Having established coefficient $K_1$, the system thermal loading is varied in a stepwise manner, as for example, by changing compressor speed or changing evaporator blower and/or condenser fan speed.

With $K_1$ set at the estabished value, and with the step change in thermal loading applied, $K_2$ and $K_3$ are varied in the emulator until SH regulation is steady about the 5° F. value and the values of $K_2$ and $K_3$ recorded. Then the microcomputer U4 is programmed to perform the calculation for PW in accordance with the equation or algorithm using the values found for $K_1$, $K_2$ and $K_3$.

It will be understood that the coefficients $K_1$, $K_2$ and $K_3$ will be valid only for the chosen sampling rate of 0.75 seconds. If a different sampling rate, such as 0.1 seconds, is to be employed in the final software, new coefficients will need to be established for the particularly chosen sampling rate.

The present invention as hereinabove described, thus provides a unique and novel way or means of controlling the flow of refrigerant in an air conditioning or refrigeration system by a width-modulated electrical pulse control signal for driving a solenoid operated refrigerant flow control valve. The control system of the present invention employs a self-heated thermistor disposed to sense the presence of liquid refrigerant in the refrigerant line returning to the compressor inlet from the evaporator discharge. The present control system employs a valve control signal having the pulse width thereof modulated in accordance with a governing equation to maintain about 5° F. of superheat in the refrigerant returning to the compressor. In the event that liquid refrigerant is present in the line returning to the compressor, the thermistor changes resistance drastically upon encountering the liquid refrigerant and the change in resistance is detected to provide appropriate changes in the pulse width modulated signal to the control valve.

Although the invention has hereinabove been described with respect to the presently preferred practice, it will be understood that modifications and variations of the invention may be made and the invention is limited only by the scope of the following claims.

I claim:

1. A system for refrigerating or conditioning air in a compartment comprising:
   (a) pump means having an inlet and outlet and operative for compressing a charge of refrigerant gas and discharging the compressed gas at said outlet;
   (b) exothermic heat exchanger means connected for receiving a flow of said compressed refrigerant from said pump means outlet and operative to cool and condense said gas to liquid;
   (c) expansion valve means connected for receiving said liquid at the inlet thereof and operative upon electrical energization to provide a pressure drop in said liquid refrigerant and to control flow thereof to the valve outlet;
   (d) endothermic heat exchanger means connected for receiving a flow of said liquid refrigerant from said expansion valve means outlet and operative to absorb sufficient heat from the compartment to be refrigerated or conditioned to heat said refrigerant and to cause said refrigerant to vaporize and including conduit means returning said vaporized refrigerant to the inlet of said pump means;
   (e) temperature sensing means including resistance means disposed to directly sense the temperature of said refrigerant discharging from said endothermic heat exchanger for returning to said pump inlet means;
   (f) means operative to provide a limited electrical current through said resistance means;
   (g) first circuit means operative to sense the voltage drop across said resistance means responsive to said current with said refrigerant flowing thereover and operative to determine the change in resistance thereof;
   (h) second circuit means operative in response to said change in resistance of said resistance means to generate an electrical pulse signal having the pulse time or width thereof corresponding to said resistance;
   (i) driver circuit means operative in response to receiving said pulse time signal to generate a periodic control signal having the ratio of "ON" time and "OFF" time in said period determined from said pulse time and a predetermined table of values, for a desired amount of superheat of refrigerant flowing over said temperature sensing means including means operative to apply said control signal to said expansion valve means for controlling refrigerant flow to modulate superheat about said desired value.

2. A refrigeration system of the type having a compressor circulating refrigerant through a condenser, an expansion valve means, an evaporator for cooling a compartment and return to the compressor, said system comprising:
   (a) actuator means operative upon electrical energization to control said expansion valve means for modulating refrigerant flow therethrough;
   (b) a thermistor disposed to directly sense the temperature of refrigerant discharging from the evaporator for returning to the compressor from said evaporator;
   (c) first circuit means operative to provide a limited flow of current through said thermistor for heating same;
   (d) means operative to detect the voltage drop across said thermistor when said current flows therethrough and said refrigerant is flowing thereover, said detecting means including means operative in response to said voltage drop to provide an electrical signal indicative of the change in resistance of said thermistor;
   (e) conversion circuit means operative in response to said resistance signal from said detecting means to provide a periodic pulse signal having the time or duration thereof corresponding to said changing thermistor resistance; and,
   (f) driver circuit means operative in response to said pulse signal to generate a control signal having the ratio of "ON" time to "OFF" time determined, by a predetermined relationship for a desired amount of superheat of refrigerant flowing over said thermistor.

3. The system defined in claim 2, wherein said actuator means comprises an electromagnetic device.

4. The system defined in claim 2 further comprising:
   (a) second temperature sensing means disposed to sense the actual temperature of refrigerant discharging from the evaporator and provide an electrical indication thereof;
   (b) circuit means responsive to said electrical indication and operative to determine the refrigerant pressure from a known pressure temperature relationship for said refrigerant and
   (c) comparator means operable to compare said pressure with a predetermined limit valve and to disable the compressor when the pressure is below said predetermined limit.

5. The system defined in claim 2 further comprising:
   (a) a third temperature sensor disposed to sense the temperature of high pressure refrigerant from the condenser entering the expansion valve means and provide an electrical indication thereof;
   (b) means responsive to said third temperature sensor operative to determine the refrigerant pressure from a known pressure-temperature relationship for the refrigerant and provide an electrical signal indicative thereof; and,
   (c) means responsive to said pressure signal operative to disable the compressor when said refrigerant pressure exceeds a predetermined limit.

6. The system defined in claim 2, wherein said predetermined relationship comprises the expression:

$$P.W._N = P.W._{N-1} + \frac{\Delta Pt}{10} + \frac{\Delta \Delta Pt}{10} + \frac{3\Delta \Delta \Delta Pt}{10}$$

wherein
P.W.=Ratio of "ON" time to "OFF" time;
Pt=pulse time signal (in milliseconds) from said conversion circuit,
$\Delta P_t$=pulse time−20.

7. A method of controlling refrigerant flow in an air conditioning or refrigeration system having a compressor circulating pressurized refrigerant through condenser and an evaporator for return to the compressor comprising the steps of:
 (a) providing an electrically operated expansion valve for controlling refrigerant flow from the condenser to the evaporator;
 (b) disposing a thermistor in the refrigerant flow path of refrigerant returning to the compressor from the evaporator and flowing an electrical current through said thermistor while refrigerant is flowing thereover;
 (c) detecting the voltage drop across said thermistor and determining the change in resistance of said thermistor;
 (d) establishing a ratio of periodic "ON" to "OFF" time for said valve during steady state system thermal load for a desired amount of superheat at said thermistor station in the refrigerant flow path; and,
 (e) generating a pulse control signal from comparison of said thermistor resistance change with a table of predetermined values of said ratio for differing values of said resistance and pulsing said valve with said control signal.

8. The method defined in claim 7, wherein said step of generating includes a comparison from a table of values $$P.W._N = P.W._{N-1} + K_1 \Delta P_t + K_2 \Delta \Delta P_t$$

where
P.W.=ratio of "ON" to "OFF" time,
$\Delta P_t = P_t - P'$;
wherein
$P_t$=pulse time (in milliseconds) from said conversion circuit
$P'$=pulse time at said desired superheat "target" value at steady state load.

9. The method defined in claim 7 wherein the step of generating a control signal for said valve further comprises a comparison from a table of values compiled from the expression $$P.W._N = P.W._{N-1} + K_1 \Delta P_t + K_2 \Delta \Delta P_t + K_3 \Delta \Delta \Delta P_t;$$

10. A system for refrigerating or conditioning air in a compartment comprising:
 (a) compressor means having an inlet and outlet;
 (b) conduit means connected for circulating a flow of refrigerant charge from said compressor outlet to said inlet and including a condenser receiving compressed refrigerant from said outlet and an evaporator receiving a flow of refrigerant from said condenser;
 (c) electrically operated expansion valve means for controlling flow of refrigerant from said condenser to said evaporator;
 (d) thermistor means disposed in said conduit means to sense the temperature of refrigerant entering said expansion valve means;
 (e) means operative to provide an electrical current through said thermistor means;
 (f) circuit means, including logic means, operative to sense the voltage drop across said thermistor means with said refrigerant flowing thereover and further operative to determine the change in resistance of said thermistor, corresponding to said voltage drop; and,
 (g) circuit means operative in response to said change in resistance of said thermistor to generate a pulsed control signal for periodically operating said expansion valve means and modulating flow therethrough about a thermistor resistance corresponding to predetermined amount of superheat of said refrigerant.

11. A method of controlling refrigerant flow in a system for refrigerating or conditioning air in a compartment comprising the steps of:
 (a) compressing and pumping compressed refrigerant first through an exothermic heat exchanger for effecting condensation thereof and then through an evaporator disposed to cool the compartment and returning said refrigerant for compressing;
 (b) pulsing an electrically operated expansion valve disposed for controlling flow of refrigerant from said evaporator returning for said compressing;
 (c) disposing a thermistor in the flow of refrigerant from said evaporator and flowing a predetermined electrical current through said thermistor and detecting the voltage drop thereacross with refrigerant flowing thereover;
 (d) converting said voltage drop to the change in resistance of said thermistor corresponding to said voltage drop;
 (e) determining the resistance of said thermistor and corresponding pulse time for said valve for maintaining a desired amount of refrigerant superheat at said thermistor flow station for a steady state system thermal load; and,
 (f) pulsing said expansion valve and modulating about said pulse time, for maintaining said desired superheat for varying system thermal loads.

12. The method defined in claim 10, wherein said step of modulating includes the step of applying a pulse to said valve according to the relationship:

$$P.W._N = P.W._{N-1} + \frac{\Delta P_t}{10} + \frac{\Delta \Delta P_t}{10} + \frac{3\Delta \Delta \Delta P_t}{10}$$

where
P.W.=ratio of "ON" to "OFF" time of the pulse;
$P_t$=pulse time (in milliseconds) from said conversion circuit
$\Delta P_t = P_t - 20$.

* * * * *